Sept. 20, 1932.   R. VON FROMMER   1,878,039
CARTRIDGE MAGAZINE FOR SMALL ARMS
Filed April 7, 1931   3 Sheets-Sheet 1
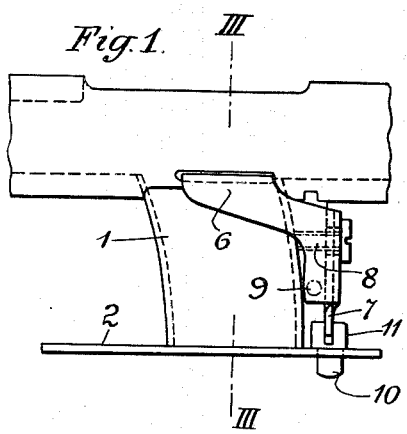
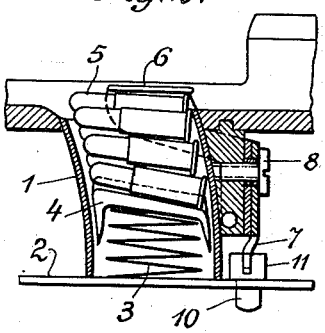
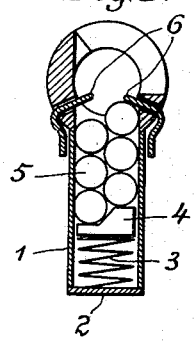
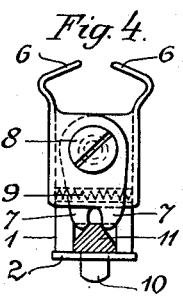
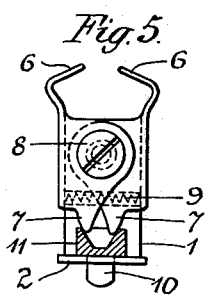
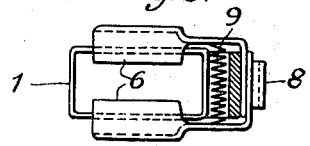
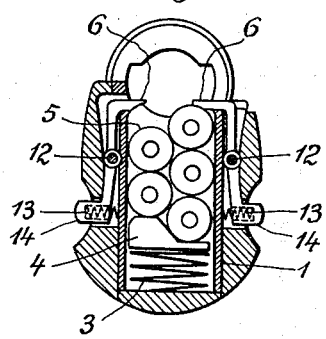
R. Von Frommer
INVENTOR Sept. 20, 1932.　　　R. VON FROMMER　　　1,878,039
CARTRIDGE MAGAZINE FOR SMALL ARMS
Filed April 7, 1931　　　3 Sheets-Sheet 2
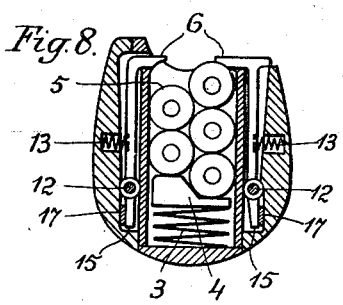
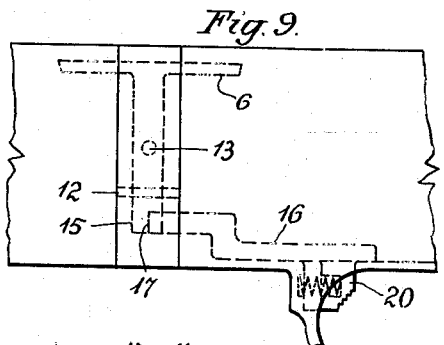
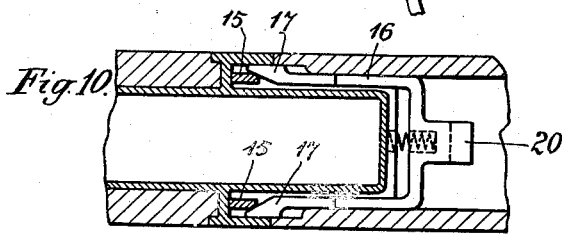
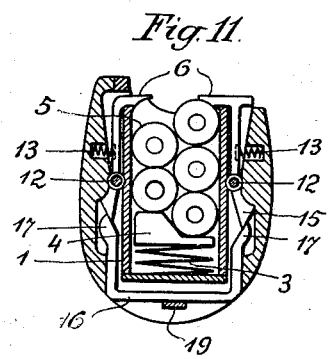
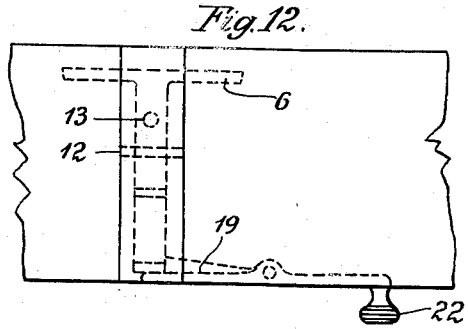
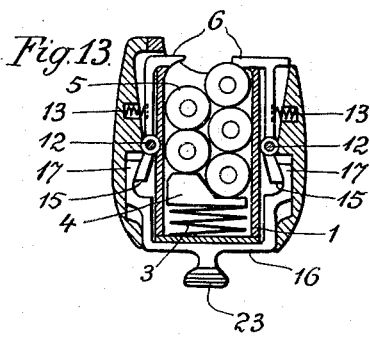
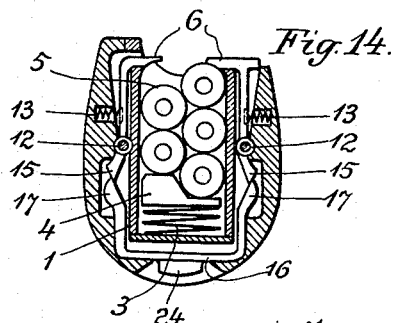
R. Von Frommer
INVENTOR

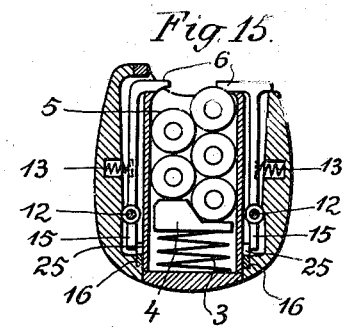
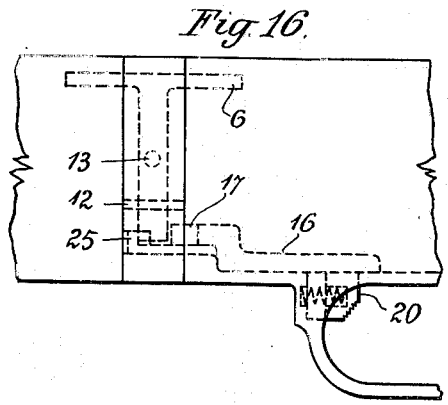
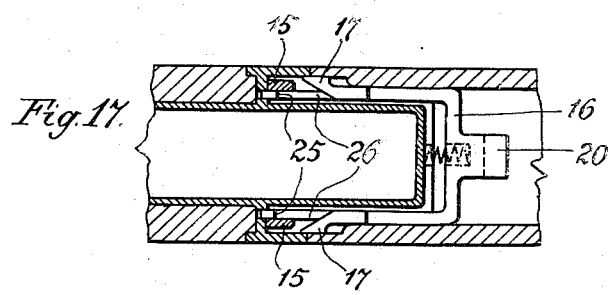
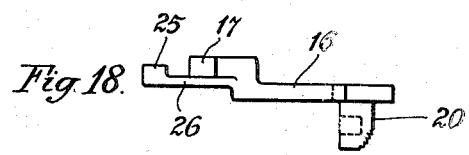
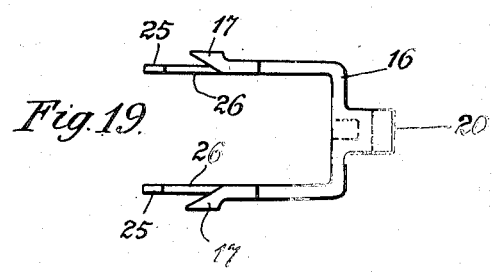

Patented Sept. 20, 1932

1,878,039

UNITED STATES PATENT OFFICE

RUDOLF VON FROMMER, OF BUDAPEST, HUNGARY

CARTRIDGE MAGAZINE FOR SMALL ARMS

Application filed April 7, 1931, Serial No. 528,415, and in Hungary April 12, 1930.

The present invention relates to cartridge magazines for small arms of the kind adapted to contain two vertical rows of cartridges and having movable elements for retaining the cartridges and limiting their movements.

The chief feature of the invention is that the said movable limiting elements of the magazine, the so-called lips, are motionless during the loading of the gun, and move only for the purpose of enabling the cartridges to be removed from the magazine.

Up till now, the removal of the cartridges from a magazine of the kind above referred to, which contains two vertical rows of cartridges but has immovable lips, or broadly speaking, cartridge holding or retaining elements, was effected either by pulling out the cartridges one after the other by means of the breech bolt, or more accurately, by the cartridge extractor thereof, or the cartridges were removed through the bottom of the magazine which could be withdrawn together with the magazine spring and platform or without these parts. Both methods are involved and the first is even dangerous, since if the gun is handled carelessly it may be unintentionally fired, thereby causing an accident. The second method has also the drawback that the cartridges can easily fall down and the removed parts of the gun must be returned again to their places.

The present invention makes it possible to remove the cartridges easily and simply by providing cartridge holding or retaining elements on the magazine, which can be moved away from the position in which they retain the cartridges, so that the cartridges become free and are pushed out from the magazine by the magazine spring. These retaining elements or lips, in order to attain the above mentioned end, are preferably pivoted, spring controlled and manually operated. In such a manner it is possible to swing the retaining elements out of their retaining position by a single tap with the finger the said elements being swung back by the action of their spring on this action ceasing.

Cartridge magazines have already been proposed containing one single cartridge row and having two lips, one of which is movable. This lip, however, must be moved away, not only when removing the cartridges, but also when loading the gun, as the clear space presented by this lip in its normal position is not large enough to allow the cartridges to be inserted into the magazine.

Contrary to these above-described devices, the magazine according to the present invention has a clear space between the two holding elements, which is greater than the largest diameter of the cartridge, so that the latter can be easily inserted into the magazine with the holding elements in their normal or holding position, that is to say without moving them apart. After insertion, however, the cartridges do not move out from the magazine even if the breech bolt is open, provided that the holding elements are not moved away.

Magazines with two movable lips are also known, but the purpose of these movable lips is quite different from that of the present invention, and it is impossible to attain the object of the present invention with these known magazines, since the guns fitted with these magazines are not provided with elements enabling the user to move away the lips of the magazine by a single tap with the finger and without taking the gun to pieces.

In the accompanying drawings some constructional forms of the invention are shown by way of example.

Fig. 1 is a partial side view of a small arm provided with a magazine constructed according to the invention.

Fig. 2 shows the same part of the gun in section.

Fig. 3 is a section taken on line III—III of Fig. 1.

Fig. 4 is a view of the holding elements of the construction according to Fig. 1 looking from the right in Fig. 1.

Fig. 5 shows another form of the holding elements.

Fig. 6 is a top plane view of the magazine according to Fig 1, but removed from the gun.

Fig. 7 is a cross sectional view of a further form of the invention.

Fig. 8 is a similar illustration of a further form.

Fig. 9 is a side view and

Fig. 10 a horizontal section of the form according to Fig. 8.

Fig. 11 is a cross sectional view and

Fig. 12 a partial side elevation of another form.

Fig. 13 is a cross sectional view of a further form.

Fig. 14 is a similar illustration of a further form.

Fig. 15 is a cross-sectional view,

Fig. 16 a side elevation and

Fig. 17 a horizontal section of another form of the invention.

Fig. 18 is a side elevation and

Fig. 19 a top plane view of a part of the last-mentioned form of the new magazine.

Referring to the drawings, bottom of the cartridge magazine 1 is formed by the plate 2. Above this plate is arranged the magazine spring 3 which presses against the platform 4. On the platform 4 are situated the cartridges 5 which are held in position against the action of the magazine spring 3 by the holding elements or lips 6. The holding elements 6 are preferably made in the form of two-armed levers, one arm of which constitutes the holding element proper and the other the controlling part. In the forms shown in Figs. 4 and 5 the levers 6, 7 are arranged scissorwise being pivoted on the common pivot 8 and are under the action of a common spring 9 which presses the lips 6 towards one another. The push button 10 underneath the plate 2 serves to open the lips 6, this button having a wedge-shaped projection 11 which is in permanent contact with the controlling parts 7 so that the push button 10 is also under the action of the common spring 9. If the button 10 is pushed inwardly, the lips 6 are swung away from one another, whereupon the cartridges 5 will be pushed out from the magazine owing to the action of the magazine spring 3.

The form shown in Fig. 5 is identical with the form according to Fig. 4 except that the controlling parts 7 cooperate with a projection 11 having inwardly sloping working surfaces, the effect of which on the lips 6 is the same as the effect of the element 11 of the form according to Fig. 4.

The construction shown in Fig. 7 is provided with cartridge holding elements 6 pivoted on separate pivots 12, and controlled by separate springs 13. The lips 6 are swung apart by pushing towards one another the projections 14 arranged at the end of the control arms of the levers and projecting out of the gun, whereupon the spring 3 pushes the cartridges up. The projections 14 can be operated by hand and without removing any part of the gun, as well as the button 10 of the form described above.

The form of the invention shown in Figs. 8, 9 and 10 has also retaining members 6 pivoted on separate pivots 12 and under the action of separate springs 13, but the arms 15 of these retaining members co-operate with wedge-shaped ends 17 of a slide 16. This slide can be shifted in the horizontal direction and its shifting from the position shown in Fig. 10 towards the left causes the swinging away of the members 6 from one another. The shifting of the slide 16 is effected by pushing the button 20, which the shooter has at hand.

The form according to Figs. 11 and 12 differs from the construction just described, in that the slide 16 is not moved in a horizontal but in a vertical direction and in order to swing away the members 6 from one another, this slide must be shifted upwardly. For this purpose a lever 19 is pivoted at the lowermost part of the gun, the handle or button 22 of which can be easily pulled down by the shooter, thus causing the lifting of the slide 16.

In the construction according to Fig. 13 the slide 16 is actuated directly by its button 23, the wedge-shaped parts 15 and 17 being of such a form that in order to make the cartridges come out from the magazine, the button 23 must be pulled down.

The form shown in Fig. 14 is substantially identical with the construction shown in Fig. 11 with the difference that the slide 16 has to be shifted directly by its button 24.

The form illustrated by the Figs. 15 to 19 is similarly designed to the form according to Figs. 8 to 10, but the slide 16, in addition to the wedge-shaped end portions 17, has on both sides a projection 26 provided with a tooth 25. These teeth serve to fix the retaining members, that is to say, maintain the arms 15 in the normal or retaining position so that before the shifting of the slide 16 towards the left, unintentional swinging of the retaining or holding members 6, 15 is avoided. In this normal position there is a small interval between the arm 15 and the wedge-shaped end 17, so that when the slide is pushed by its button 20, first the teeth 25 are moved away from the arms 15 and the retaining members become free, whereupon the ends 17 come into action and the elements are swung away as described above.

The members 26 adapted to move the teeth 25, must be arranged outside the path of the arms 15, in order to leave a clear space for the swinging movement of the arms. In the form shown this is attained by the projections or rods 26 situated underneath the ends of the arms 15.

Of course, the breech bolt as well as the parts of the lips projecting into the magazine must be formed in such a manner that, during the operation of the breech, these parts may not interfere with one another.

Having now particularly described and ascertained the nature of my said invention and in what manner the same is to be performed, I declare that what I claim is:—

1. In a cartridge magazine for small arms adapted to contain two rows of cartridges, a magazine spring tending to push the cartridges out of the magazine, two movable levers having lips adapted to retain the cartridges in the magazine, springs pressing said levers into the position in which their lips retain the cartridges in the magazine, means for swinging said levers so as to move away from one another said lips against the action of said springs till the cartridges become free, such means being situated so as to be operated manually.

2. In a cartridge magazine for small arms adapted to contain two rows of cartridges, a magazine spring tending to push the cartridges out of the magazine, two movable lips adapted to retain the cartridges in the magazine, springs pressing said lips into the position in which they retain the cartridges in the magazine, a push button having a wedge-shaped projection adapted to move said lips away from one another against the action of said springs till the cartridges become free.

3. In a cartridge magazine for small arms adapted to contain two rows of cartridges, a magazine spring tending to push the cartridges out of the magazine, two movable lips adapted to retain the cartridges in the magazine, springs pressing said lips into the position in which they retain the cartridges in the magazine, a manually operated slide having a wedge-shaped projection adapted to move said lips away from one another against the action of said springs till the cartridges become free.

4. In a cartridge magazine for small arms adapted to contain two rows of cartridges, a magazine spring tending to push the cartridges out of the magazine, two movable levers having lips adapted to retain the cartridges in the magazine, springs pressing said levers into the position in which their lips retain the cartridges in the magazine, a push button having a wedge-shaped projection adapted to swing said levers so as to move away from one another said lips against the action of said springs till the cartridges become free.

5. In a cartridge magazine for small arms adapted to contain two rows of cartridges, a magazine spring tending to push the cartridges out of the magazine, two movable levers having lips adapted to retain the cartridges in the magazine, springs pressing said levers into the position in which their lips retain the cartridges in the magazine, a manually operated slide having a wedge-shaped projection adapted to swing said levers so as to move away from one another said lips against the action of said springs till the cartridges become free.

6. In a cartridge magazine for small arms as claimed in claim 3, teeth fitted on the manually operated slide and adapted to keep the movable lips in their retaining position.

7. In a cartridge magazine for small arms as claimed in claim 5, teeth fitted on the manually operated slide and adapted to keep the movable lips in their retaining position.

8. In a cartridge magazine for small arms adapted to contain two rows of cartridges, a magazine spring tending to push the cartridges out of the magazine, two movable lips adapted to retain the cartridges in the magazine, springs pressing said lips into the position in which they retain the cartridges in the magazine, a manually operated slide, projections on said slide having wedge-shaped ends adapted to move said lips away from one another against the action of said springs till the cartridges become free, such wedge-shaped ends being situated in a certain distance from said lips in the retaining position of the latter, teeth made integral with said slide and adapted to keep said lips in their retaining position.

9. In a cartridge magazine for small arms adapted to contain two rows of cartridges, a magazine spring tending to push the cartridges out of the magazine, two movable levers having lips adapted to retain the cartridges in the magazine, springs pressing said levers into the position in which their lips retain the cartridges in the magazine, a manually operated slide, projections on said slide having wedge-shaped ends adapted to swing said levers so as to move said lips away from one another against the action of said springs till the cartridges become free, such wedge-shaped ends being situated in a certain distance from said levers in the retaining position of said lips, teeth made integral with said slide and adapted to keep said levers in their position in which said lips retain the cartridges in the magazine.

10. In a cartridge magazine for small arms as claimed in claim 5, projections arranged on the manually operated slide and situated outside the path of the levers forming the retaining elements, teeth on said projections adapted to keep the said levers in their retaining position.

In testimony whereof I affix my signature.

RUDOLF von FROMMER.